(12) United States Patent
Moskovchenko et al.

(10) Patent No.: US 12,532,007 B2
(45) Date of Patent: Jan. 20, 2026

(54) SYSTEMS AND METHODS FOR ADAPTING UNMANNED AERIAL VEHICLE VIDEO STREAM QUALITY TO WIRELESS CONNECTION QUALITY WITH GROUND STATION

(71) Applicant: Skydio, Inc., San Mateo, CA (US)

(72) Inventors: Stepan Moskovchenko, Belmont, CA (US); Jerry Feng, San Mateo, CA (US)

(73) Assignee: Skydio, Inc., San Mateo, CA (US)

( * ) Notice: Subject to any disclaimer, the term of this patent is extended or adjusted under 35 U.S.C. 154(b) by 83 days.

(21) Appl. No.: 18/522,913

(22) Filed: Nov. 29, 2023

(65) Prior Publication Data

US 2024/0179329 A1     May 30, 2024

Related U.S. Application Data

(60) Provisional application No. 63/385,315, filed on Nov. 29, 2022.

(51) Int. Cl.
*H04N 19/33*     (2014.01)
*H04N 19/146*     (2014.01)
*H04N 21/2343*     (2011.01)

(52) U.S. Cl.
CPC .......... *H04N 19/33* (2014.11); *H04N 19/146* (2014.11); *H04N 21/234363* (2013.01)

(58) Field of Classification Search
CPC ................. H04N 19/33; H04N 19/146; H04N 21/234363; H04N 19/164
See application file for complete search history.

(56) References Cited

U.S. PATENT DOCUMENTS

2014/0059166 A1*    2/2014    Mann ............. H04N 21/234381
                                                                   709/217

FOREIGN PATENT DOCUMENTS

| CN | 102428703 B | * | 12/2015 | ............. A63F 13/12 |
|---|---|---|---|---|
| CN | 111279640 A | * | 6/2020 | ........... H04L 1/0083 |
| CN | 114500727 A | * | 5/2022 | |
| CN | 116170587 A | * | 5/2023 | |
| WO | WO-2016139604 A1 | * | 9/2016 | ........... B64C 39/024 |

* cited by examiner

*Primary Examiner* — Tracy Y. Li

(57) ABSTRACT

Systems, methods, and software for operating an unmanned aerial vehicle (UAV). A method includes capturing a video stream using one or more camera sensors of the UAV. The method includes transmitting data representative of the video stream to a ground station communicably coupled to the UAV. The method includes determining one or more performance characteristics of a communications link between the UAV and the ground station. The method includes adjusting a resolution of the video stream according to the one or more performance characteristics of the communication link. Embodiments of the present technology provide continuity of video quality for viewing by UAV users at ground stations responsive to variations in video data transmission capacity during flight operations with minimal, or no, detrimental impact on user experience.

20 Claims, 8 Drawing Sheets

SYSTEMS AND METHODS FOR ADAPTING UNMANNED AERIAL VEHICLE VIDEO STREAM QUALITY TO WIRELESS CONNECTION QUALITY WITH GROUND STATION

CROSS-REFERENCE TO RELATED APPLICATIONS

This application claims priority to and benefit of U.S. Provisional Patent Application Ser. No. 63/385,315, filed Nov. 29, 2022, and entitled "Systems And Methods For Adapting Unmanned Aerial Vehicle Video Stream Quality to Wireless Connection Quality with Ground Station," the contents of which are expressly incorporated by reference in its entirety for all purposes herein. This application is related to U.S. patent application Ser. No. (Not Yet Assigned), Ser. No. 18/522,754, which claims priority and benefit to U.S. Provisional Patent Application Ser. No. 63/385,256, filed Nov. 29, 2022, and entitled "Systems And Methods For Switching Of Video Streams Provided To A Ground Station From Various Sources Onboard An Unmanned Aerial Vehicle," filed on the same day as this application, the contents of which are expressly incorporated by reference herein.

TECHNICAL FIELD

Various implementations of the present technology relate to unmanned aerial vehicles (UAVs) and, in particular, to task management of unmanned aerial vehicles.

BACKGROUND

Unmanned aerial vehicles (UAVs, a.k.a. drones) find uses in a variety of applications by a variety of private, commercial and government users. At least some known UAV systems and associated operational techniques transmit image or video data wirelessly to ground stations during flight. UAVs may be piloted by users at substantial distances from a ground station. Wireless connections between UAVs and ground stations may have varying quality caused by effects such as distance and interference. Changed characteristics of such wireless connections may impact the quality of image or video data received by ground stations from UAVs.

Accordingly, a need exists for technology that overcomes the problems demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following detailed description.

SUMMARY

The present technology provides systems, methods, and software for operating an unmanned aerial vehicle (UAV). A first aspect of the disclosure provides a method for operating a UAV. The method includes capturing a video stream using one or more camera sensors of the UAV. The method includes transmitting data representative of the video stream to a ground station communicably coupled to the UAV. The method includes determining one or more performance characteristics of a communications link between the UAV and the ground station. The method includes adjusting a resolution of the video stream according to the one or more performance characteristics of the communications link.

A second aspect of the disclosure provides a UAV system. The system includes one or more camera sensors for capturing a video stream. The system includes a communications interface. The system includes at least one computing device disposed onboard the UAV and operably coupled to the communications interface, and the one or more camera sensors. In the system, the at least one computing device directs the communications interface to transmit, via a communications link, data representative of the video stream to a ground station communicably coupled to the UAV. The at least one computing device determines one or more performance characteristics of the communications link. The at least one computing device adjusts a resolution of the video stream according to the one or more performance characteristics of the communications link.

A third aspect of the disclosure provides one or more non-transitory computer readable media. The one or more non-transitory computer readable media has stored thereon program instructions which, when executed by a computing device, cause a UAV to direct a communications interface of or associated with the UAV to transmit, via a communications link, a video stream captured by one or more camera sensors of the UAV to a ground station. When executed by the computing device, the program instructions cause the UAV to determine one or more performance characteristics of the communications link. When executed by the computing device, the program instructions cause the UAV to adjust a resolution of the video stream according to the one or more performance characteristics of the communications link.

Embodiments of the present technology provide for enhanced continuity of video quality for viewing by UAV users at ground stations responsive to variations in video data transmission capacity during flight operations, thereby improving user experiences as compared to conventional systems and techniques. Examples of embodiments of the present technology are provided and described in the Detailed Description with reference to the Drawings.

BRIEF DESCRIPTION OF THE DRAWINGS

One or more embodiments of the present invention are illustrated by way of example and not limitation in the figures of the accompanying drawings, wherein alphanumeric labels correspond to their mention in the Detailed Description.

Figure 1:
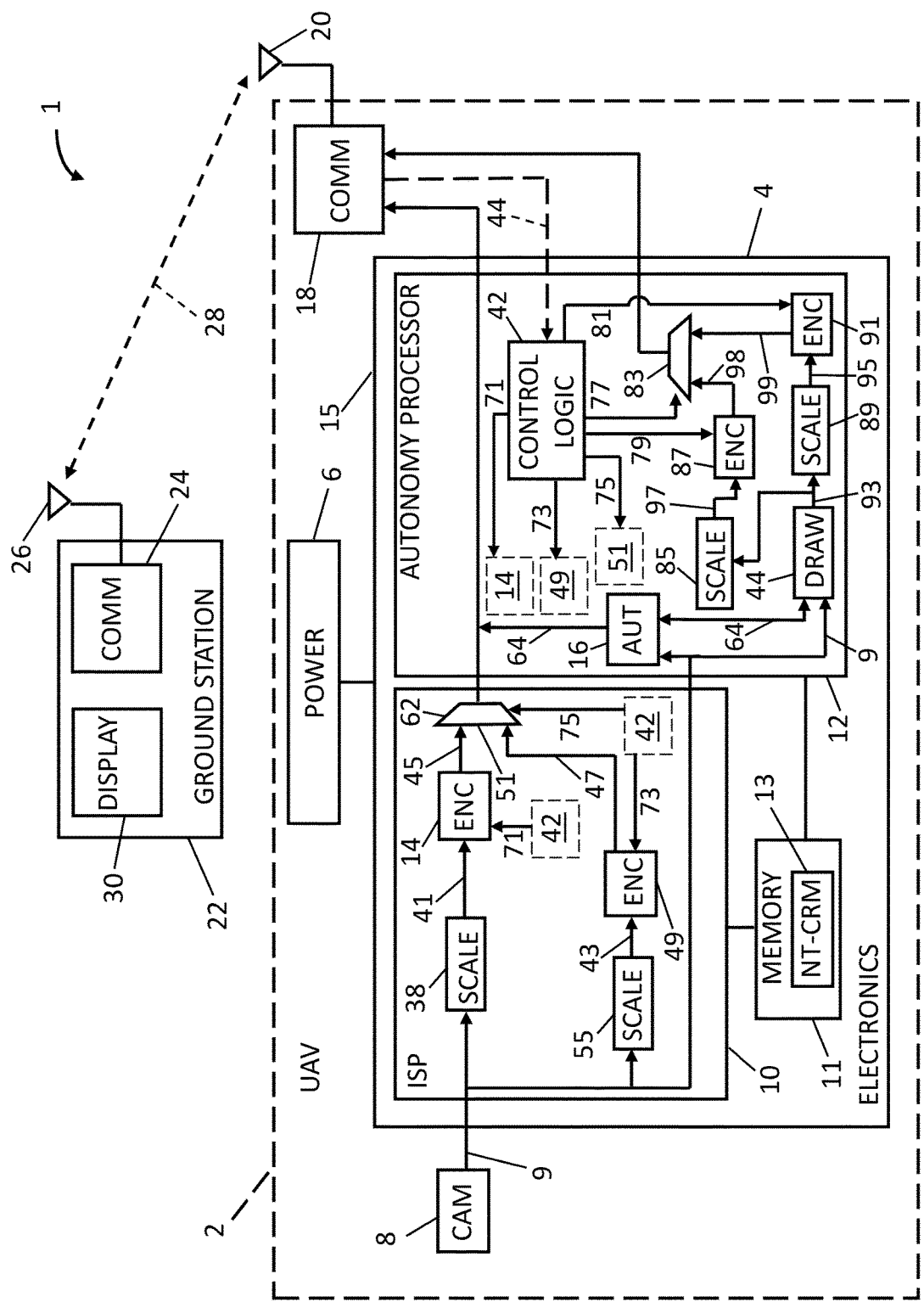
FIG. 1 depicts a block diagram of an unmanned aerial vehicle (UAV) system in accordance with some embodiments.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods, computing processes and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

This present disclosure describes computing, communication and data storage systems, methods, and software for providing enhanced continuity of video quality for viewing by UAV users at ground stations responsive to variations in video data transmission capacity during flight operations. The embodiments of the present disclosure improve upon, and provide unique technical benefits to, technology fields including UAV-related systems and methods of operation involving image processing of video streams, and transmission thereof, from onboard camera sensors. The various technical benefits and effects of the disclosed embodiments are implemented specifically and exclusively in specialized computing, communication and data storage devices and systems. Although some such devices and their interconnections may be known to persons of ordinary skill in the art, their configuration and use as described herein provide an advantageous contribution to the technical problem of how to provide continuity of video quality for viewing by UAV users at ground stations responsive to variations in video data transmission capacity during flight operations with minimal, or no, detrimental impact on user experience, according to the disclosed embodiments.

As will become apparent to persons skilled in the art, the disclosed embodiments are not merely process steps capable of being performed using generic computing devices, but which could be performed mentally or otherwise by a human being, including with the aid of pen and paper. Rather, the unique algorithms described herein are required to be encoded in software instructions to direct (e.g., "cause") the physical actions of the various computing, communications and data storage devices in a manner believed to be as yet unknown in the pertinent technological field. These physical effects and actions include, without limitation, transmission of encoded data as signals over wired or wireless communication channels, both within one particular computing device and over great distances over spans of the Earth or outer space. The described algorithms direct data to be stored according to received data inputs originating from camera sensors of the UAV and from a ground station utilized for piloting the UAV, among other purposes. All of these actions, and numerous others that are described herein, are performed by physical computing and communication devices, as directed by the disclosed algorithms.

Furthermore, the physical actions which are specifically caused to occur using computing devices having processors taking as commands encoded software or firmware instructions stored in non-transient computer-readable storage media are performed and coordinated thereby in substantially real-time. Real-time is defined as a very nearly instantaneous result of an input, stimulus, or computation performed by a computing device as described herein, where the timing of a subsequent action is limited only by the physical makeup or design of the computing device and communications network. For example, a duration between a time upon which a result of a first computation is generated by a first networked computing device a time between that result becomes available for a subsequent computation by a second networked computing device may be limited only by a transmission time required by the physical medium of the wired, optical or wireless network connecting the first and second computing devices.

A person having ordinary skill in the art will recognize and appreciate that not only are the disclosed algorithms incapable of being performed mentally by a human being, they are certainly not capable of being performed mentally with the aid of pen and paper in real time, or otherwise by a human being within a time sufficient to provide both the disclosed technical advantages and effects, and the improved user experience, in the practical application to the pertinent technological field.

More particularly, the disclosed embodiments enable continuity of video quality for viewing by UAV users at ground stations responsive to variations in video data transmission capacity during flight operations, thereby enhancing user experiences as compared to conventional systems and techniques. As one example, the disclosed systems, methods and software for operating a UAV improve upon conventional techniques for providing continuity of video quality for viewing by UAV users at ground stations responsive to variations in video data transmission capacity during flight operations with minimal, or no, detrimental impact on user experience.

FIG. 1 depicts a block diagram of a UAV system 1 in accordance with some embodiments. UAV system 1 may include a UAV 2 with on-board electronics 4. UAV 2 may also include an electric power source 6, such as a rechargeable battery pack, operably coupled to electronics 4 to supply power thereto during operation of UAV 2. UAV 2 may include one or more camera sensors 8, such as red-green-blue (RGB) type cameras and/or infrared (IR) cameras, for obtaining still image and/or video streams during operation of UAV 2. Electronics 4 may include one or more integrated circuits having various functionality for implementing the present technology as described herein. In some embodiments, electronics 4 is essentially a single integrated circuit, while in other embodiments, electronics 4 may include a plurality of different but interconnected integrated circuits, where each integrated circuit may provide a separate, or subset of, functionality to electronics 4 for implementing the present technology. As used herein, module or modules may refer to a functional block or set of interconnected blocks of electronics 4, where such module(s) may include digital and/or analog electronic components of the wider electronics 4 of UAV 2, and which may further include computing and memory data storage devices that may be dedicated for use by specific modules, or which may be shared amongst two or more modules of electronics 4. Such structure and function of module(s) of electronics 4 according to the present technology is expected to become fully apparent to persons having ordinary skill in the art upon further study of the disclosure.

Electronics 4 may include an image signal processor (ISP) module 10 operably coupled in communication with camera sensor(s) 8. Electronics 4 may also include an autonomy processor (AP) module 12 operably coupled in communication with ISP module 10. Electronics 4 may further include at least one memory data storage device ("memory" for short) 11 operably coupled in communication with ISP module 10 and/or AP module 12. Memory 11 may be capable of storing image data including such data generated by camera sensor(s) 8. Memory 11 may be capable of permanently storing such data in a format that is readable by devices and systems operable by a user of UAV 2 that are external to UAV 2. For example, and without limitation, memory 11 may at least in part be embodied in a removable disk, such as a SECURE DIGITAL (SD) card. As another example, a user of UAV 2 may read image data from memory 11 using a wired (e.g., serial) connection such as universal serial bus (USB). Memory 11 may store configuration data for use during operation of UAV 2 according to the present technology. Memory 11 may include one or more non-transient computer readable media (NT-CRM) 13. NT-CRM 13 may have stored thereon as, for instance, software and/or firmware code in assembled and compiled form for use by computing device(s) such as processors of electronics 4 to implement, execute, or otherwise facilitate various useful operations and algorithms during operation of UAV 2 according to the present technology.

UAV 2 includes various mechanical and other electronic components like motors and associated controllers for flight. These are not shown in FIG. 1 as they exceed the scope and spirit of this disclosure. Persons having ordinary skill in the art are expected to be able to readily envision such components and their usage in conjunction with the present technology, which may find advantageous application in a wide array of types of UAVs and similar vehicles, even ground or water based vehicles, beyond those commercially available and in development by the Applicant.

UAV 2 may include a communications interface 18 operably coupled in communication with AP module 12. In some embodiments, communications interface 18 may include one or more radio frequency (RF) antenna(s) 20. Communication interface 18 may be embodied in an RF transceiver capable of transmitting and receiving signals encoding various types of data useful to system 1 during operation of UAV 2. In some embodiments, communication interface 18 utilizes WiFi communication protocols for its transceiver functionality. System 1 may also include a ground station 22. Ground station 22 may include a communication interface 24 for communicating, e.g., via RF antenna(s) 26 using WiFi, with UAV 2. In some embodiments, ground station 22 may also include an electronic display device 30 providing user(s) of system 1 the ability to see video from camera sensor(s) 8 in real time by way of an RF communications link 28 established between communication interface 24 and communication interface 18.

ISP module 10 may include a first encoder 14, and a first scaler 38 operably coupled in communication with first encoder 38 and camera sensor(s) 8. Image data, e.g., video stream 9, captured by camera sensor(s) 8 may be in luminance-bandwidth-chrominance (YUV) format. Camera sensor(s) 8 may pass video stream 9 in YUV format to first scaler 38 for scaling an unencoded and unscaled video stream 9 to a resolution of 360p. Frames of a 360p resolution video are 480×360 pixels and thus have a total of 172,800 pixels displayed on, for example, display device 30. Encoder 14 may encode a scaled 360p YUV video stream 41 at 15 frames per second (fps) into H.264 video format at 30 fps. As such, encoder 14 may output an encoded 360p video stream 45 for further use according to the present technology.

ISP module 10 may also include a second encoder 49, and a second scaler 55 operably coupled in communication with second encoder 49 and camera sensor(s) 8. Camera sensor(s) 8 may pass video stream 9 in YUV format to second scalar 55 for scaling the unencoded and unscaled video stream 9 to a resolution of 720p. Frames of a 720p resolution video are 1280×720 pixels and thus have a total of 921,600 pixels displayed on, for example, display device 30. Encoder 49 may encode a scaled 720p YUV video stream 43 at 15 fps into H.264 video format at 30 fps. As such, encoder 49 may output an encoded 720p video stream 47 for further use according to the present technology.

AP module 4 may be operably coupled in communication with ISP module 10 to take as inputs encoded H.264 video streams 45 and 47 from encoder 14 and encoder 49, respectively, as well as unencoded and unscaled YUV video stream 9. AP module 4 may include an autonomy module 16 to receive YUV video stream 9 from camera sensor(s) 8 for further processing. Functionality of AP module 4 may include navigation of UAV 2 and other advantageous operations of UAV 2, such as detection and/or tracking of objects captured by camera sensor(s) 8 to be annotated and/or tracked. Autonomy module 16 may be involved in performing data processing to facilitate such functions and operations perform such functions, and other functions which are beyond the scope and spirit of the present disclosure.

Electronics 4 may include switch and control logic 42 circuitry. ISP module 10 may include a first such switch embodied in a multiplexer 62 operably coupled in communication with AP module 12 on its downstream side, and with encoders 14 and 49 on its upstream side. In some embodiments, AP module 12 includes control logic 42 circuitry operably coupled to multiplexer 62. Multiplexer 62 may be operably coupled in communication with control logic 42. Multiplexer 62 may receive a switching control signal 75 from control logic 42. Multiplexer 62 may take as its inputs encoded 360p video stream 45 and encoded 720p video stream 47 and, depending on a state of multiplexer 62 under command of control logic 42, pass either encoded 360p video stream 45 or encoded 720p video stream 47, but not both, for transmission to ground station by way of communication interface 18.

AP module 12 may also include a drawing module 44 operably coupled in communication with camera sensor(s) 8 downstream of drawing module 44 with respect to a direction of video data flow in system 1. In some embodiments, drawing module 44 may also be operably coupled in communication on its downstream side with autonomy module 16. Autonomy module 16 may receive YUV video stream 9, process those data, and transmit a signal 64 encoding data representative of one or more annotations for use by drawing module 44 for drawing annotations on video stream(s) 9. As further described in U.S. Provisional Patent Application No. 63/385,256, the aforementioned data encoded by signal 64 may alternatively or instead be transmitted along with H.264 format 360p or 720p video streams 45 or 47, respectively, to ground station 22 in cases where ground station 22 is capable of drawing annotations on the video for the benefit of user(s) of ground station 22.

AP module 12 may also include a third encoder 87, and a third scaler 85 operably coupled in communication with encoder 87 and drawing module 44. Camera sensor(s) 8 may pass video stream 9 in YUV format to drawing module 44 for annotations to be added, and subsequently pass a YUV format unencoded annotated video stream 93 to scaler 85 for scaling video stream 93 to a resolution of 360p. Encoder 87 may encode a scaled annotated 360p YUV video stream 97 at 15 fps into H.264 video format at 30 fps. As such, encoder 87 may output an encoded 360p video stream 98 for further use according to the present technology.

AP module 12 may further include a fourth encoder 91, and a fourth scaler 89 operably coupled in communication with encoder 91 and drawing module 44. The YUV format unencoded annotated video stream 93 may be passed by drawing module 44 to scaler 89 for scaling video stream 93 to a resolution of 720p. Encoder 91 may encode a scaled annotated 720p YUV video stream 95 at 15 fps into H.264 video format at 30 fps. As such, encoder 91 may output an encoded 720p video stream 99 for further use according to the present technology.

AP module 12 may include a second switch embodied in a multiplexer 83 operably coupled in communication with encoders 87 and 91 on it downstream side, and with communications interface 18 on its upstream side. Multiplexer 83 may be operably coupled in communication with control logic 42 to receive a switching control signal 77 therefrom. Multiplexer 83 may take as its inputs encoded 360p video stream 98 and encoded 720p video stream 99 and, depending on a state of multiplexer 83 under command of control logic 42, pass either video stream 98 or video stream 99, but not both, subsequent transmission to ground station by way of communication interface 18.

Control logic 42 circuitry may be operably coupled in communication with communications interface to receive a signal 44 therefrom. Signal 44 may encode data representative of one or more performance characteristics of the communications link 28 between communications interfaces 28 and 24 of system 1 and ground station 22, respectively. In one embodiment, the aforementioned performance characteristic(s) may include a bandwidth of communications link 28. Such bandwidth may range during operation of system 1 from a maximum of 10 megabits per second (Mbps, or more succinctly M) down to a minimum of 0.1 M. The bandwidth of communications link 28 may vary up and down during operation of UAV 2 during a single flight. Factors influencing such variation in bandwidth may include distance between UAV 2 and ground station 22, as well as a presence or absence, and extent, of RF interference. In other embodiments, instead of or in addition to bandwidth, performance characteristic(s) of communications link 28 may include received signal strength indication (RSSI), among other measurable parameters.

In one example, control logic 42 includes analog and/or digital electronics capable of determining the performance characteristic(s) of communications link 28. In another example, communications interface 28 includes components that are capable of performing that function, and passes signal 44 to control logic 42 for processing of the data encoded by signal 44 for various advantageous ends according to the present technology, including control of states of multiplexers 62 and 83 by way of switch control signals 75 and 77, respectively.

In one example, the video stream (e.g., 45) output by multiplexer 62 may be increased from 360p to 720p in response to communications interface 18 or control logic 42 identifying an increase in communications link 28 bandwidth from, for example and without limitation, less than ($<$) 1 M to greater than or equal to ($\geq$) 1 M. In another example, the video stream (e.g., 45) output by multiplexer 62 may be increased from 360p to 720p in response to communications interface 18 or control logic 42 identifying an increase in communications link 28 bandwidth from, for example and without limitation, less than or equal to ($\leq$) 1 M to greater than ($>$) 1 M. In still another example, the video stream (e.g., 47) output by multiplexer 62 may be decreased from 720p to 360p in response to communications interface 18 or control logic 42 identifying a decrease in communications link 28 bandwidth from, for example and without limitation, $\geq 1$ M to $<1$ M. In yet another example, the video stream (e.g., 47) output by multiplexer 62 may be decreased from 720p to 360p in response to communications interface 18 or control logic 42 identifying a decrease in communications link 28 bandwidth from, for example and without limitation, $>1$ M to $\leq 1$ M.

In one example, the video stream (e.g., 98) output by multiplexer 83 may be increased from 360p to 720p in response to communications interface 18 or control logic 42 identifying an increase in communications link 28 bandwidth from, for example and without limitation, $<1$ M to $\geq 1$ M. In another example, the video stream (e.g., 98) output by multiplexer 83 may be increased from 360p to 720p in response to communications interface 18 or control logic 42 identifying an increase in communications link 28 bandwidth from, for example and without limitation, $\leq 1$ M to $>1$ M. In still another example, the video stream (e.g., 99) output by multiplexer 83 may be decreased from 720p to 360p in response to communications interface 18 or control logic 42 identifying a decrease in communications link 28 bandwidth from, for example and without limitation, ≥1 M to <1 M. In yet another example, the video stream (e.g., 99) output by multiplexer 83 may be decreased from 720p to 360p in response to communications interface 18 or control logic 42 identifying a decrease in communications link 28 bandwidth from, for example and without limitation, >1 M to ≤1 M.

In some embodiments, control logic 42 circuitry may be operably coupled in communication with encoders 14, 49, 87 and 91. Control logic 42 may pass a control signal 71 to encoder 14 to command encoder 14 to adjust its encoding bit rate according to the performance characteristic(s) of communications link 28. Similarly, control logic 42 may pass a control signal 73 to encoder 49 to command encoder 49 to adjust its encoding bit rate according to the performance characteristic(s) of communications link 28. Likewise, control logic 42 may pass a control signal 79 to encoder 87 to command encoder 87 to adjust its encoding bit rate according to the performance characteristic(s) of communications link 28. Similarly, control logic 42 may pass a control signal 81 to encoder 91 to command encoder 91 to adjust its encoding bit rate according to the performance characteristic(s) of communications link 28. In one example, the aforementioned encoding bit rate of at least one of encoder(s) 14, 49, 87 and 91 may be decreased in response to communications interface 18 or control logic 42 identifying a decrease in communications link 28 bandwidth (e.g., at or below 1 M). In another example, the aforementioned encoding bit rate of at least one of encoder(s) 14, 49, 87 and 91 may be increased in response to communications interface 18 or control logic 42 identifying an increase in communications link 28 bandwidth (e.g., at or above 1 M).

Ground station 22 may be embodied in one of several types of machines. One example ground station 22 is a smartphone running a specialized application for piloting UAV2 and viewing video therefrom. In the smartphone, or likewise field laptop, case, the application may be capable of drawing annotations as part of rendering video on display 30. In another example, ground station 22 may be embodied in a machine that is not fully, or even partially, capable of drawing annotations on video. Whereas a smartphone application may be designed to be used effectively with a specific UAV 2 as its ground station 22 including for annotations of video, a ground station 22 not having that capability may still be utilized to display video from UAV 2 to users. Enabling such other ground stations 22 to be used to pilot UAV 2 and view video therefrom is advantageous because it may expand the reach of useful applications that UAV 2 may be used for (e.g., police, military, fire, search & rescue, etc.) where smartphones with tailored applications may be unavailable, as described in U.S. Provisional Patent Application No. 63/385,256.

Figure 2A:
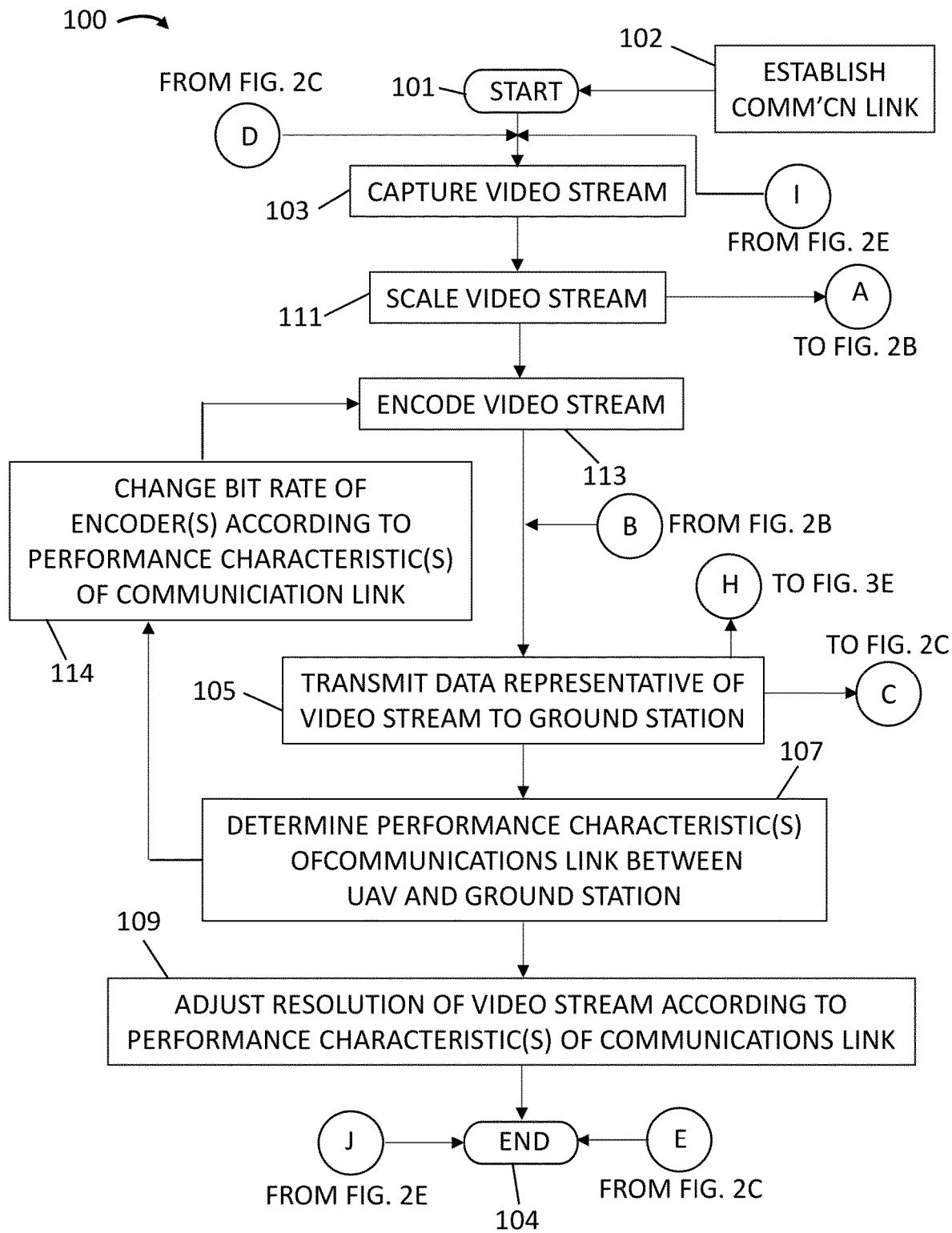
FIGS. 2A-2F depict flow charts of a method for operating the UAV system shown in FIG. 1 in accordance with some embodiments.

FIGS. 2A-2F depict flow charts of a method 100 for operating the UAV system (e.g., system 1) shown in FIG. 1 in accordance with some embodiments. Referring now to FIG. 2A, and with further reference back to FIG. 1, and their description above, method 100 may commence from a start state 101. In an example, start state 101 may correspond to the UAV 2 being powered on following a period of being powered off or being in a sleep or other low power consumption mode of operation. In another example, method 100 may include the step of establishing 102 (e.g., using WiFi) communications link 28 between UAV 2 and ground station 22, and start state 101 may additionally, or instead, correspond to communications link 28 being effectively established 102.

Method 100 may include the step of capturing 103 a video stream (e.g., video stream 9) using the one or more camera sensors 8 of UAV 2. Method 100 may also include the step of transmitting 105 (e.g., using communications interface 18 and via communications link 28) data representative of the video stream 9 to ground station 22. Such data representative of video stream 9 may refer to scaled and encoded forms of video stream 9 generated according to the present technology. Method 100 may further include the step of determining 107, e.g., by control logic 42, communications interface 18, or similarly capable computing device(s) of UAV 2, performance characteristic(s) (e.g., bandwidth) of communications link 28. Method 100 may also include the step of adjusting 109 the resolution (e.g., 360p to 720p, or vice versa) of video stream 9 according to the performance characteristic(s) of communications link 28.

In some embodiments, method 100 may also include the step of scaling 111 video stream 9 captured from camera sensor(s) 8 to a scaled video stream (e.g., 41 or 43) prior to performance of the transmitting 105 step. Method 100 may further include the step of encoding 113 video stream 9 after performance of the scaling 111, and before performance of the transmitting 105, steps. In some embodiments, method 100 may also include the step of changing 114 an encoding bit rate of one or more of encoders 14, 49, 87 and 91 according to the performance characteristic(s) of the communications link 28.

Figure 2B:
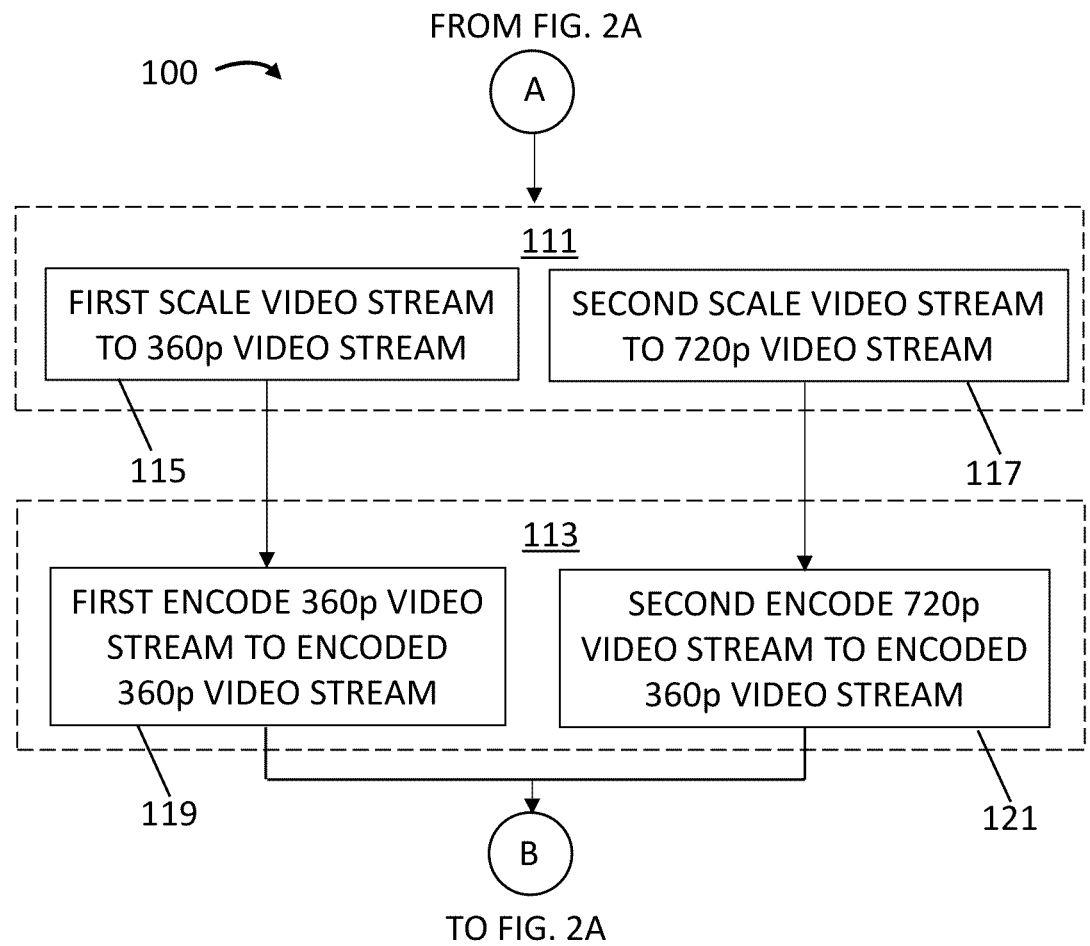

Referring now to FIG. 2B, and transitioning thereto from FIG. 2A from the circled letter "A," in some embodiments, the step of scaling 111 the video stream 9 in method 100 may include the steps of first scaling 115 (e.g., using scaler 38) video stream 9 to a 360p video stream 41, and second scaling 117 (e.g., using scaler 55) video stream 9 to a 720p video stream 43. Similarly, in some embodiments, the encoding 113 step of method 100 may include the steps of first encoding 119 (e.g., using encoder 14) the 360p video stream 41 to an encoded (e.g., H.264) 360p video stream 45, and second encoding 121 (e.g., using encoder 49) the 720p video stream 43 to an encoded (e.g., H.264) 720p video stream 47. From the first 118 and second 121 encoding steps, the process of method 100 may proceed to the transmitting 105 step, transitioning from FIG. 2B back to FIG. 2A via the circled letter "B."

Figure 2C:
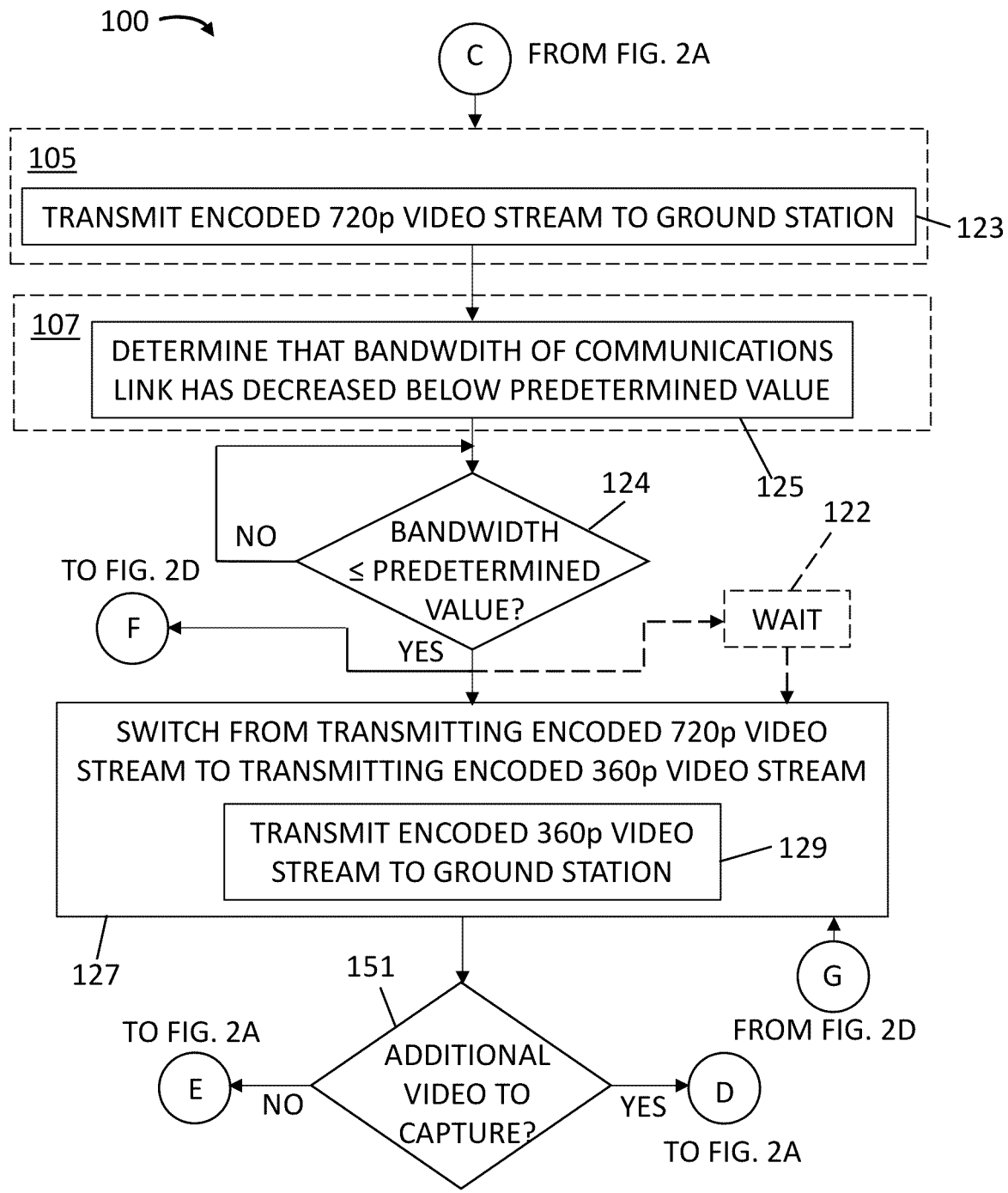

Referring now to FIG. 2C, and transitioning thereto from FIG. 2A from the circled letter "C," the method 100 step of transmitting 105 data representative of the video stream 9 to ground station 22 may include transmitting 123 data representative of the encoded 720p video stream 47 to ground station 22. In this case, the bandwidth of a WiFi communications link 28 may be, for example and without limitation, in the range of 1 M to 10 M, and the 720p video viewed by a user on display device 30 of ground station 22 may be adequate and preferable to the viewer, and not experiencing any delay, stalling, or distortion, etc. As shown in FIG. 2C, in embodiments where the 720p video stream 47 is being initially, or currently, transmitted 123 to ground station 22, the method 100 step of determining 107 performance characteristic(s) of communications link 28 may include determining 125 that the bandwidth, or other suitable performance characteristic(s), has decreased below a predetermining bandwidth value (e.g., 1 M), or has entered a new range of bandwidth values (e.g., between 0.7 M and 1 M) representative of a diminished capacity of communications link 28.

The process of method 100 may include a logical branch 124 whereby it is identified whether or not bandwidth and/or other performance characteristic(s) have decreased to, or below, the predetermined value. In response to identifying, e.g., in logical branch 124, that such communications link 28 performance characteristic(s) have not decreased below 1 M, for instance, method 100 may loop back to logical branch 124, including iteratively, as needed. Alternatively, in response to identifying, e.g., in logical branch 124, that communications link 28 bandwidth has decreased below 1 M, for instance, method 100 may proceed to a first switching 127 step.

In an example, control logic 42 or other suitable computing device of UAV 2 electronics 4 may wait 126 for a first predetermined period of time after identifying, in logical branch 124, the aforementioned decrease in bandwidth before sending control signal 75 to multiplexer 62 for the purposes described in greater detail below. When present in method 100, the waiting 126 step may provide for resolution of only a momentary disruption or temporary change in video data carrying capacity of communications link 28 without intervention by further processing according to the present technology. This may promote conservation of power during operation of UAV 2. The value of the first predetermined period of time may be selected based upon a tolerable amount of performance and quality degradation in the rendering and display of 720p video stream 47 at ground station 22. That value may also depend on a specific application for UAV 2, where some applications (e.g., zooming in on persons' faces in a crowd to identify someone) may have a lower tolerance to intermittent video display degradation as compared to other applications (e.g., finding and tracking a single white colored horse in a herd of otherwise brown horses in an unforested field).

Referring still to FIG. 2C, control logic 42 circuitry may transmit switch control signal 75 to multiplexer 62 to switch 127 from transmitting 123 the encoded 720p video stream 47 to ground station 22 to transmitting 129 the encoded 360p video stream 45 to ground station 22 in response to determining 125 that the bandwidth of the communications link 28 has decreased below the predetermined bandwidth value.

Video encoders that may be utilized in the systems and methods according to the present technology may take as inputs YUV format video streams and output respectively H.264 encoded video streams containing a plurality of I frames and a plurality of P frames, where there are more P frames produced by the encoders as compared to I frames. Encoders may produce I frames according to a predetermined and periodic schedule. When switching between two H.264 encoded video streams (e.g., 45 and 47) for transmission to a common recipient device (e.g., ground station 22), it is advantageous to time the switch so that the video stream to be switched to starts to be transmitted with an I frame. Doing so may help ensure continuity in rendering and display of video of a common scene (360p vs. 720p video of a common scene captured 103 by camera sensor (8)). A control scheme according to the present technology may enable encoders as used in method 100 with, e.g., system 1, to produce I frames off schedule so as to facilitate switching in a timely manner with little to no interruption in video rendering and display.

Figure 2D:
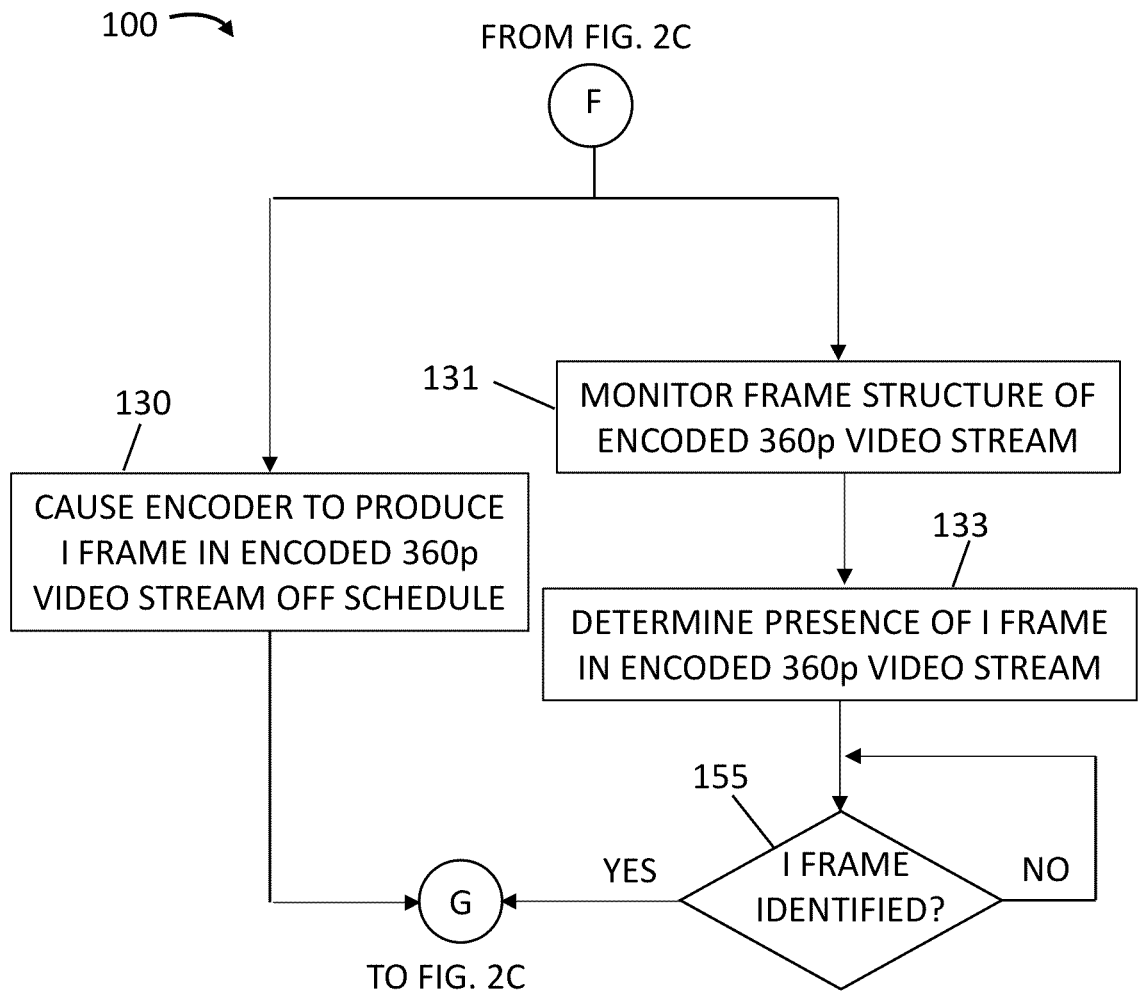

To this beneficial end, method 100 may perform one or more additional processing steps further in response to identifying, e.g., in logical branch 124, that the bandwidth of the communications link 28 has decreased below the predetermined bandwidth value. Referring now to FIG. 2D, and transitioning thereto from FIG. 2C from the circled letter "F," in some embodiments, method 100 may include the step of causing 130, e.g., by control logic 42, encoder 14 to produce an I frame in the encoded 360p video stream 45 sooner, e.g., off schedule. In an example, control logic 42 may sense, e.g., during or after processing in logical branch 124, identification of the bandwidth of communications link 28 being less than, or less than or equal to, the predetermined bandwidth value, and transmit a control signal 71 to encoder 14 to command it to produce an I frame in the desired video stream 45 for transmission to ground station 22 sooner than dictated by the aforementioned periodic schedule.

Inclusion of the causing 130 step in method 100 may thereby reduce the latency between the time when the decrease in link 28 bandwidth is determined 125 and the time when the first switching 127 is performed in method 100. This aspect of the present technology follows from an assumption that for the link 28 bandwidth falling to, or below, 1 M, diminished video quality at the display 30 of ground station 22 may result. Whether or not such diminished quality does occur, or is discernible to a ground station 22 user, processing including the causing 130 step in method 100 may help ensure that the transition between encoded 360p and 720p video streams 45 and 47 does not negatively impact the user experience at ground station 22.

Still referring to FIG. 2D, in some embodiments, and further in response to determining 125 that the bandwidth of the communications link 28 has decreased below the predetermined bandwidth value, method 100 may include the steps of monitoring 131 a frame structure of the desired encoded 360p video stream 45, and determining 133, based on the monitoring 131, a presence of the I frame (e.g., a next I frame) in video stream 45. In one example, encoder 14 may monitor 131 the aforementioned frame structure and determine 133 the presence of the I frame in the encoded 360p video stream 45. In the example, encoder 14 may, upon determining 133 the I frame in video stream 45, provide a responsive signal to control logic 42, thereby prompting it to pass switch control signal 75 to multiplexer 62 for the first switching 127. In another example, control logic 42 may monitor frame structure of the encoded 360p video stream 45. In that case, control logic 42 may, upon determining 133 the I frame, then send control signal 75 to multiplexer 62 to initiate the first switching 127 in method 100.

In some embodiments, method 100 may include either or both of the causing 130, and the monitoring 131 and determining 133, steps, as described above. In any event, after performance of the causing 130 and/or determining 133 steps, method 100 may proceed to a logical branch 155, whereby the I frame is identified in the desired encoded 360p video stream 45. For the I frame not being identified in logical branch 155, method 100 may loop back to logical branch 155, including iteratively, as necessary. However, for identification of I frame in logical branch 155, and in response thereto, method 100 may proceed to the above described first switching 127 step, with the process transitioning from FIG. 2D back to FIG. 2C via the circled letter "G."

Referring again to FIG. 2C, following performance of either the transmitting 129 step in method 100, the process may proceed to a logical branch 151, whereby UAV 2 system 1 may identify whether or not there is additional video to be captured (e.g., by camera sensor(s) 8) and processed according to the present technology. This identification in method 100 may include determining if additional video stream data is incoming to ISP module 10 and/or AP module 12. Where additional video to be captured is identified at logical branch 151, method 100 may proceed to iterate through the process described above with reference to the foregoing figures, transitioning from FIG. 2C back to FIG. 2A via the circled letter "D." However, where no additional video to be captured is identified at logical branch 151, method 100 may instead proceed to an end state 104, with the process transitioning from FIG. 2C back to FIG. 2A via the circled letter "E." In an example, where there is no additional video to be captured in method 100, electronics 4 or part of the above described components thereof, may enter a powered off or low power (e.g., sleep) mode for the end state 104. In another example, method 100 may proceed to the end state 104 by the action of a user of UAV 2, as in turning its power off.

Figure 2E:
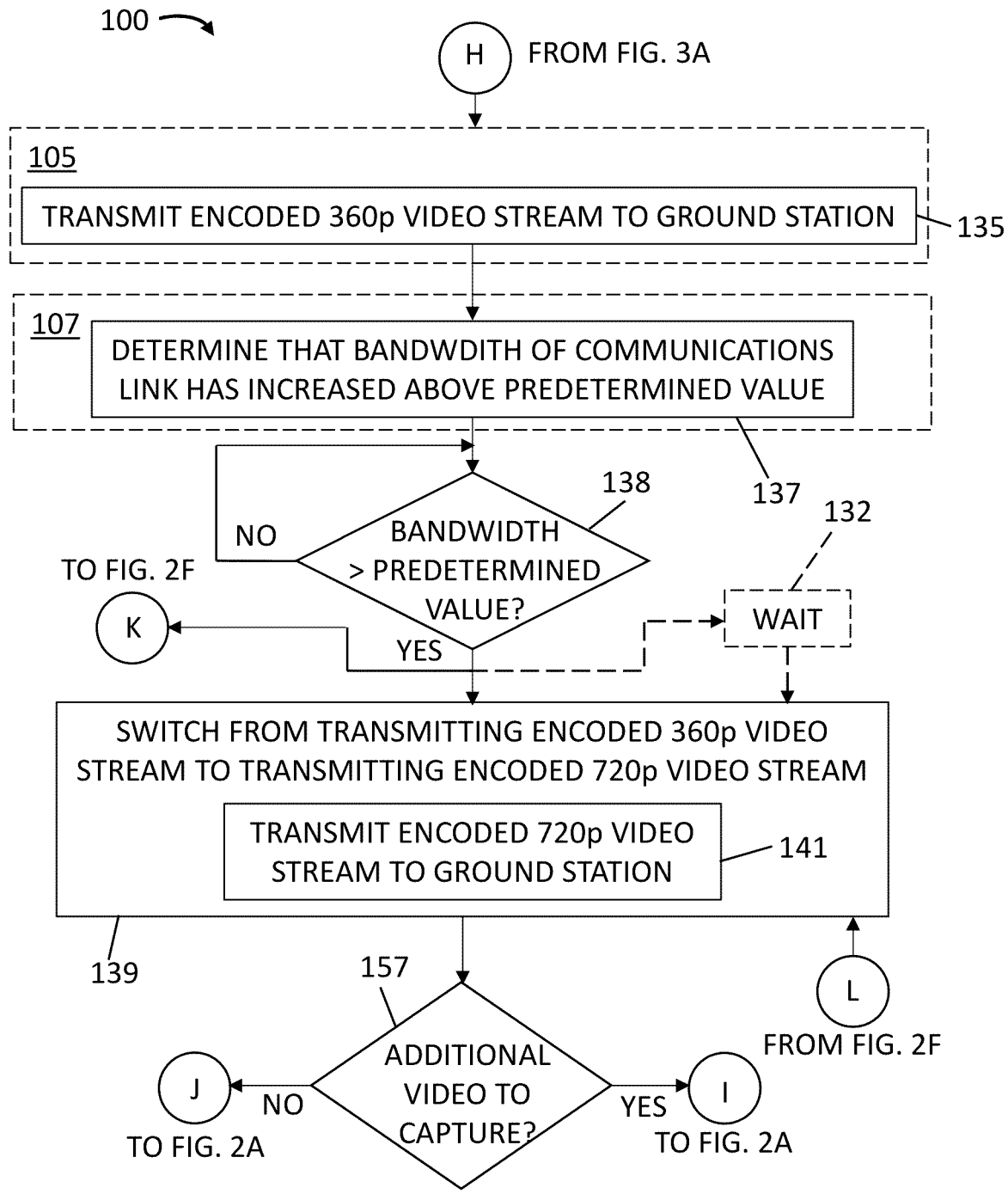

Referring now to FIG. 2D, and transitioning thereto from FIG. 2A from the circled letter "H," the method 100 step of transmitting 105 data representative of the video stream 9 to ground station 22 may include transmitting 135 data representative of the encoded 360p video stream 45 to ground station 22. In this case, the bandwidth of a WiFi communications link 28 may be, for example and without limitation, in the range of 0.1 M to 1 M, and the 360p video viewed by a user on display device 30 of ground station 22 may be adequate, and not experiencing any delay, stalling, or distortion, etc. However, some users may prefer to view the 720p video at ground station 22 for any of a number of reasons. As shown in FIG. 2E, in embodiments where the 360p video stream 45 is being initially, or currently, transmitted 135 to ground station 22, the method 100 step of determining 107 performance characteristic(s) of communications link 28 may include determining 137 that the bandwidth, or other suitable performance characteristic(s), has increased above a predetermining bandwidth value (e.g., 1 M), or has entered a new range of bandwidth values (e.g., between 0.7 M and 1 M) representative of an increased capacity of communications link 28.

The process of method 100 may include a logical branch 138 whereby it is identified whether or not bandwidth and/or other performance characteristic(s) have increased to, or above, the predetermined value. In response to identifying, e.g., in logical branch 138, that such communications link 28 performance characteristic(s) have not decreased above 1 M, for instance, method 100 may loop back to logical branch 138, including iteratively, as needed. Alternatively, in response to identifying, e.g., in logical branch 138, that communications link 28 bandwidth has increased above 1 M, for instance, method 100 may proceed to a second switching 139 step.

In an example, control logic 42 or other suitable computing device of UAV 2 electronics 4 may wait 132 for a second predetermined period of time after identifying, in logical branch 138, the aforementioned increase in bandwidth before sending control signal 75 to multiplexer 62 for the purposes described in greater detail below. When present in method 100, the waiting 132 step may provide for resolution of only a momentary disruption or temporary change in video data carrying capacity of communications link 28 without intervention by further processing according to the present technology. This may promote conservation of power during operation of UAV 2. The value of the second predetermined period of time may be selected based upon a tolerable amount of performance and quality degradation in the rendering and display of 360p video stream 45 at ground station 22 as compared to the same for 720p video stream 47. That value may also depend on a specific application for UAV 2, where some applications (e.g., zooming in on license plate of a car to clearly read it) may require a higher video resolution as compared to other applications (e.g., locating a plume of smoke in a wider view of a forest).

Referring still to FIG. 2E, control logic 42 circuitry may transmit switch control signal 75 to multiplexer 62 to switch 139 from transmitting 135 the encoded 360p video stream 45 to ground station 22 to transmitting 141 the encoded 720p video stream 45 to ground station 22 in response to determining 137 that the bandwidth of the communications link 28 has increased above the predetermined bandwidth value.

Figure 2F:
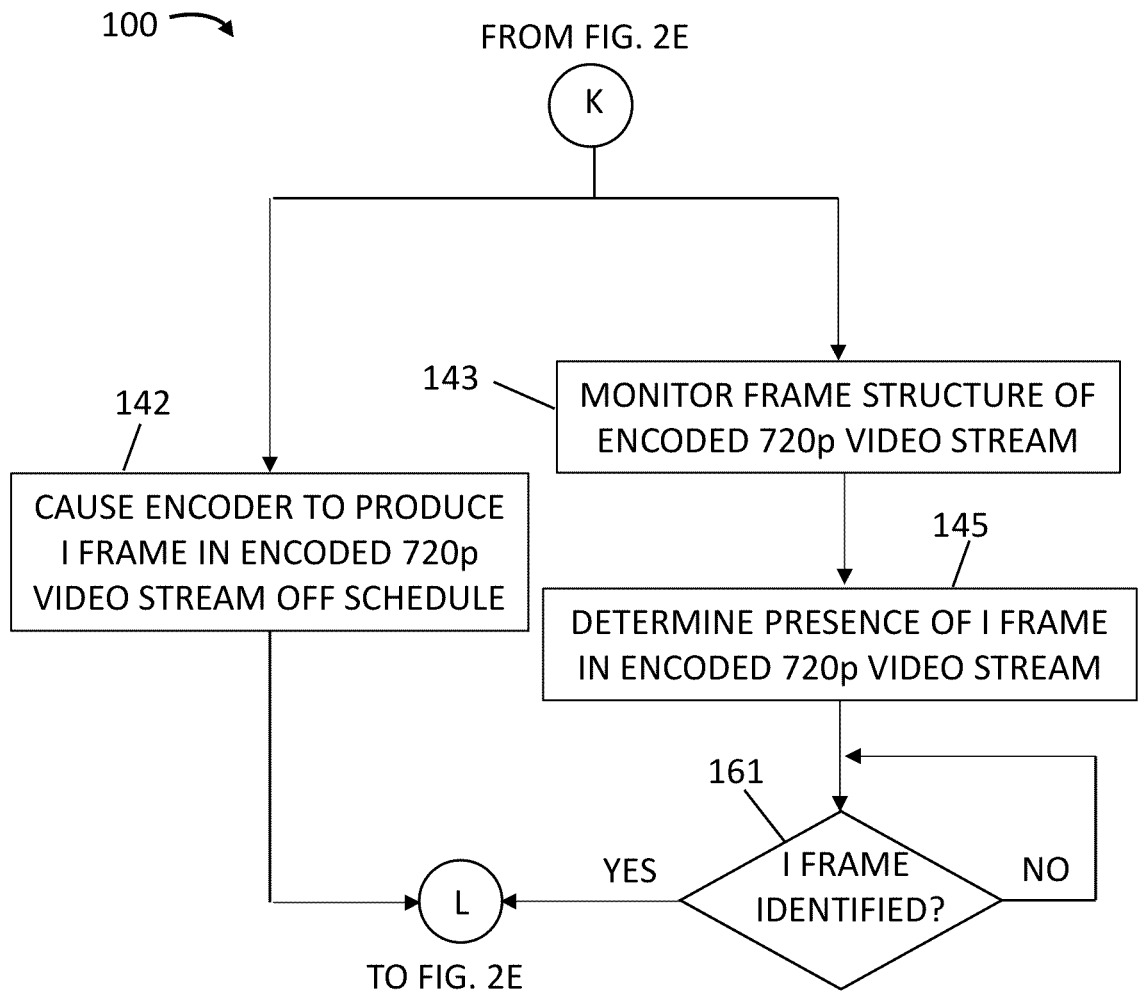

Further to the beneficial end of enhancing the user experience by ensuring continuity in rendering and display of video of a common scene, method 100 may perform one or more additional processing steps further in response to identifying, e.g., in logical branch 138, that the bandwidth of the communications link 28 has increased above the predetermined bandwidth value. Referring now to FIG. 2F, and transitioning thereto from FIG. 2E from the circled letter "K," in some embodiments, method 100 may include the step of causing 142, e.g., by control logic 42, encoder 49 to produce an I frame in the encoded 720p video stream 47 sooner, e.g., off schedule. In an example, control logic 42 may sense, e.g., during or after processing in logical branch 138, identification of the bandwidth of communications link 28 being greater than, or greater than or equal to, the predetermined bandwidth value, and transmit a control signal 73 to encoder 49 to command it to produce an I frame in the desired video stream 47 for transmission to ground station 22 sooner than dictated by the periodic schedule at which encoder 49 is set.

Inclusion of the causing 142 step in method 100 may thereby reduce the latency between the time when the increase in link 28 bandwidth is determined 137 and the time when the second switching 139 is performed in method 100. This aspect of the present technology follows from an assumption that for the link 28 bandwidth rising to, or above, 1 M, better video quality at the display 30 of ground station 22 may result. Whether or not such better quality does occur, or is discernible to a ground station 22 user, processing including the causing 142 step in method 100 may help ensure that the transition between encoded 720p and 360p video streams 47 and 45 does not negatively impact the user experience at ground station 22.

Still referring to FIG. 2E, in some embodiments, and further in response to determining 137 that the bandwidth of the communications link 28 has increased above the predetermined bandwidth value, method 100 may include the steps of monitoring 143 a frame structure of the desired encoded 720p video stream 47, and determining 145, based on the monitoring 143, a presence of the I frame (e.g., a next I frame) in video stream 47. In one example, encoder 49 may monitor 145 the aforementioned frame structure and determine 145 the presence of the I frame in the encoded 720p video stream 47. In the example, encoder 49 may, upon determining 145 the I frame in video stream 47, provide a responsive signal to control logic 42, thereby prompting it to pass switch control signal 75 to multiplexer 62 for the second switching 139. In another example, control logic 42 may monitor frame structure of the encoded 720p video stream 47. In that case, control logic 42 may, upon determining 145 the I frame, then send control signal 75 to multiplexer 62 to initiate the second switching 139 in method 100.

In some embodiments, method 100 may include either or both of the causing 142, and the monitoring 143 and determining 145, steps, as described above. In any event, after performance of the causing 142 and/or determining 145 steps, method 100 may proceed to a logical branch 161, whereby the I frame is identified in the desired encoded 720p video stream 47. For the I frame not being identified in logical branch 161, method 100 may loop back to logical branch 161, including iteratively, as necessary. However, for identification of I frame in logical branch 161, and in response thereto, method 100 may proceed to the above described second switching 139 step, with the process transitioning from FIG. 2F back to FIG. 2E via the circled letter "L."

Following performance of the transmitting 141 step in method 100, the process may proceed to a logical branch 157, whereby UAV 2 system 1 may identify whether or not there is additional video to be captured (e.g., by camera sensor(s) 8) and processed according to the present technology. This identification in method 100 may include determining if additional video stream data is incoming to ISP module 10 and/or AP module 12. Where additional video to be captured is identified at logical branch 138, method 100 may proceed to iterate through the process described above with reference to the foregoing figures, transitioning from FIG. 2E back to FIG. 2A via the circled letter "I." However, where no additional video to be captured is identified at logical branch 157, method 100 may instead proceed to the end state 104, as described above, with the process transitioning from FIG. 2E back to FIG. 2A via the circled letter "J."

Figure 3:
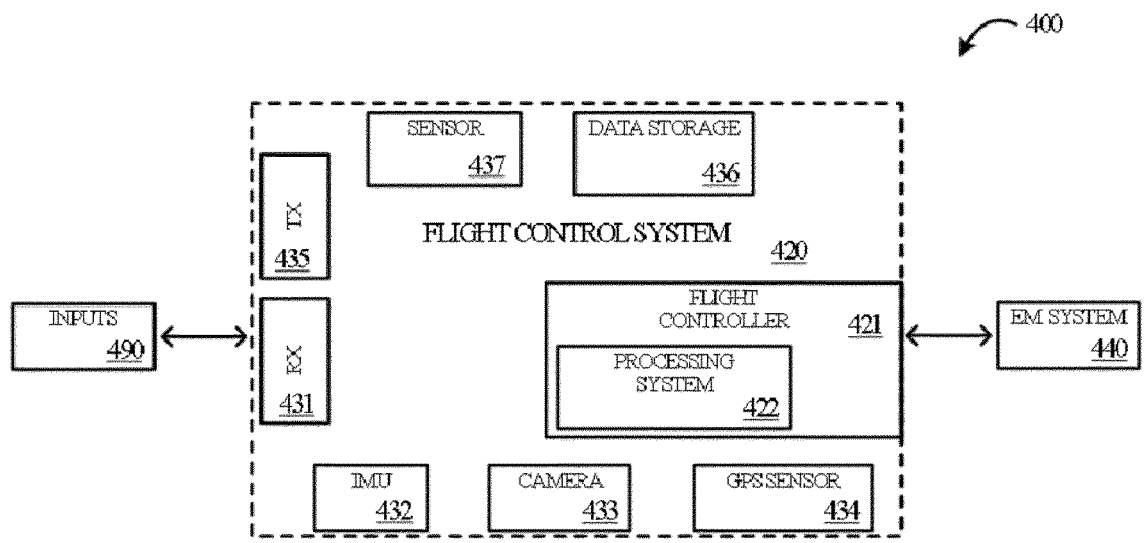
FIG. 3 depicts a systems architecture of a UAV in an implementation.

FIG. 3 depicts a systems architecture 400 of a UAV, such as UAV 2, in an implementation. Systems architecture 400 includes flight control system 420, electromechanical system 440, and operational inputs 490. Flight control system 420 comprises one or more receivers RX 431 for receiving operational inputs 490, such as wireless network communication or flight commands from a remote control device (e.g., ground station 22). Flight control system 420 further comprises flight controller 421, inertial measurement unit (IMU) 432, camera 433, GPS sensor 434, transmitter TX 435, and data storage 436. Data storage 436 includes persistent or nonvolatile memory or a removable memory card (e.g., an SD card) for recording flight and sensor data gathered from onboard devices, including photos or video captured by onboard cameras, or for storing programmed flight programs for use by the UAV. Flight control system 420 may also comprise one or more other sensors 437 such as barometers, altimeters, additional cameras, heat-detecting sensors, electromagnetic sensors (e.g., infrared or ultraviolet), compasses, anemometers or wind sensors, magnetometers, and so on. Onboard camera 433 comprises a device for capturing imaging data, such as video or still photography, across visible and other wavelengths of the electromagnetic spectrum, such as ultraviolet or infrared wavelengths.

Electromechanical system 440 provides the propulsion for the UAV, typically comprising an electronic speed controller which throttles one or more rotors according to flight instructions received from flight control system 420. It may be appreciated that both flight control system 420 and electromechanical system 440 can include other elements in addition to (or in place of) those disclosed herein, which are illustrated for exemplary purposes.

Figure 4:
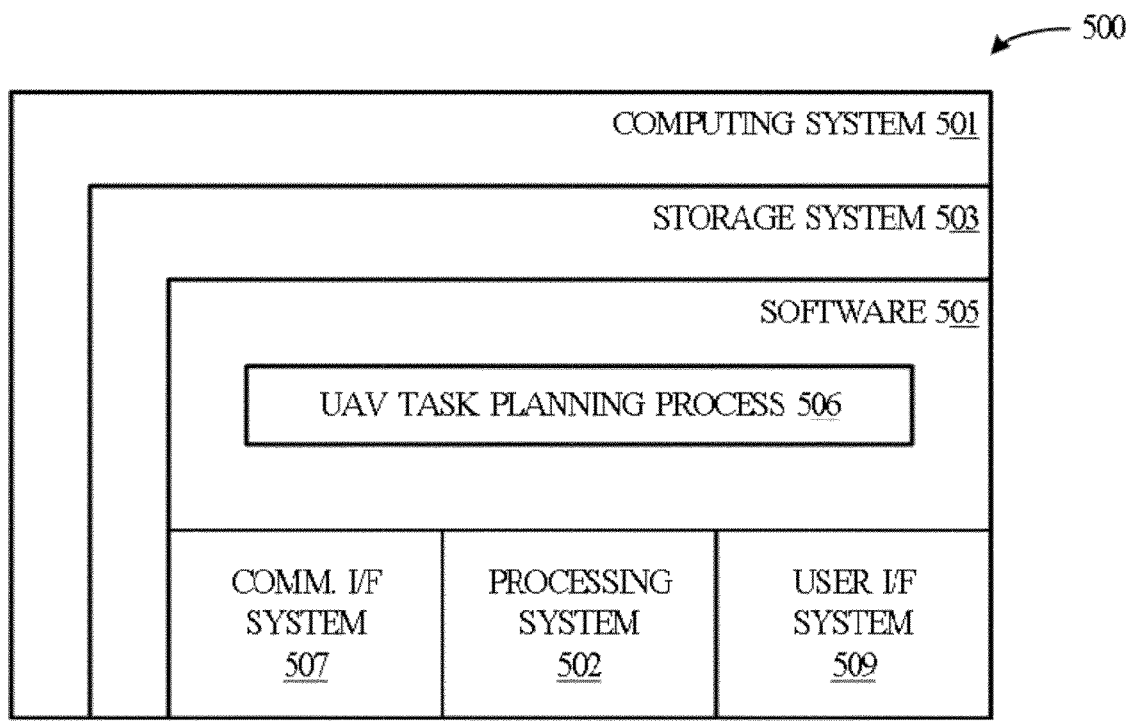
FIG. 4 depicts a block diagram of a computing system suitable for implementing the various operational environments, architectures, processes, scenarios, and sequences discussed below with respect to the other figures.

FIG. 4 depicts a block diagram of a computing system 500 suitable for implementing the various operational environments, architectures, processes, scenarios, and sequences discussed below with respect to the other figures. Computing system 500 may include a computing device 501 that is representative of any system or collection of systems in which the various processes, programs, services, and scenarios disclosed herein may be implemented. Examples of computing device 501 include, but are not limited to, server computers, web servers, cloud computing platforms, and data center equipment, as well as any other type of physical or virtual server machine, container, and any variation or combination thereof. Examples also include desktop and laptop computers, tablet computers, mobile computers, and wearable devices.

Computing device 501 may be implemented as a single apparatus, system, or device or may be implemented in a distributed manner as multiple apparatuses, systems, or devices. Computing device 501 includes, but is not limited to, processing system 502, storage system 503, software 505, communication interface system 507, and user interface system 509 (optional). Processing system 502 is operatively coupled with storage system 503, communication interface system 507, and user interface system 509.

Processing system 502 loads and executes software 505 from storage system 503. Software 505 includes and implements task planning process 506, which is representative of the UAV-related processes described above according to the present technology with respect to the preceding figures, such as method 100. When executed by processing system 502, software 505 directs processing system 502 to operate as described herein for at least the various processes, operational scenarios, and sequences discussed in the foregoing implementations. Computing device 501 may optionally include additional devices, features, or functionality not discussed for purposes of brevity.

Referring still to FIG. 4, processing system 502 may comprise a micro-processor and other circuitry that retrieves and executes software 505 from storage system 503. Processing system 502 may be implemented within a single processing device but may also be distributed across multiple processing devices or sub-systems that cooperate in executing program instructions. Examples of processing system 502 include general purpose central processing units, graphical processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device but may also be implemented across multiple storage devices or sub-systems co-located or distributed relative to each other. Storage system 503 may comprise additional elements, such as a controller, capable of communicating with processing system 502 or possibly other systems.

Software 505 (including UAV task planning process 506) may be implemented in program instructions and among other functions may, when executed by processing system 502, direct processing system 502 to operate as described with respect to the various operational scenarios, sequences, and processes illustrated herein. For example, software 505 may include program instructions for implementing the UAV task planning processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtualization software, or other application software. Software 505 may also comprise firmware or some other form of machine-readable processing instructions executable by processing system 502.

In general, software 505 may, when loaded into processing system 502 and executed, transform a suitable apparatus, system, or device (of which computing device 501 is representative) overall from a general-purpose computing system into a special-purpose computing system customized to support sensor device deployments and swaps. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary, etc.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 501 and other computing systems (e.g., ground station 22), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

Unless the context clearly requires otherwise, throughout the description and the claims, the words "comprise," "comprising," "such as," and "the like" are to be construed in an inclusive sense, as opposed to an exclusive or exhaustive sense, that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology may be presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of operating an unmanned aerial vehicle (UAV), the method comprising:
    capturing a video stream using one or more camera sensors of the UAV;
    encoding the video stream in accordance with a control schedule resulting in a first encoded video stream and a second encoded video stream;
    transmitting data representative of one of the first and second encoded video streams to a ground station communicably coupled to the UAV;
    determining one or more performance characteristics of a communications link between the UAV and the ground station; and
    adjusting a resolution of the video stream according to the one or more performance characteristics of the communications link, wherein adjusting the resolution of the video stream comprises:
        encoding, out-of-synchronization with the control schedule, at least a portion of the one of the first encoded video stream and the second encoded video stream resulting in an updated one of the first and second encoded video streams; and
        switching transmission of the data representative of the video stream from the one of the first and second encoded video streams to the updated one of the first and second encoded video streams.

2. The method of claim 1 further comprising scaling the video stream captured from the one or more camera sensors to a scaled video stream prior to the transmitting.

3. The method of claim 2 wherein encoding the video stream occurs after the scaling and prior to the transmitting.

4. The method of claim 3 further comprising changing a bit rate of at least one encoder for the encoding according to the one or more performance characteristics of the communications link.

5. The method of claim 2, wherein scaling the video stream comprises:
    first scaling the video stream to a 360p video stream; and
    second scaling the video stream to a 720p video stream.

6. The method of claim 5, wherein the first encoded video stream comprises an encoded 720p video stream, and wherein the second encoded video stream comprises an encoded 360p video stream.

7. The method of claim 6, wherein encoding, out-of-synchronization with the control schedule, at least the portion of the one of the first and second video streams comprises encoding at least the portion of one of the first and second video streams ahead of a scheduled time indicated in the control schedule.

8. The method of claim 7, wherein determining one or more performance characteristics of the communications link comprises determining that a bandwidth of the communications link has decreased to, or below, a predetermined bandwidth value.

9. The method of claim 8 wherein adjusting the resolution of the video stream according to the one or more performance characteristics of the communications link comprises adjusting the resolution of the video stream in response to determining that the bandwidth of the communications link has decreased to, or below, the predetermined bandwidth value.

10. The method of claim 9 wherein transmitting the data representative of the one of the first and second video streams comprises transmitting the first encoded video stream to the ground station, and wherein switching transmission of the data representative of the video stream comprises generating a signal to selectively provide the updated second encoded video stream for transmission via the communication link between the UAV and the ground station.

11. The method of claim 9 further comprising:
    further in response to determining that the bandwidth of the communications link has decreased to, or below, the predetermined bandwidth value,
    monitoring a frame structure of the second encoded video stream; and
    determining, based on the monitoring, a presence of an I frame in the second encoded video stream.

12. The method of claim 11, wherein transmitting the data representative of the one of the first and second video streams comprises transmitting the first encoded video stream to the ground station, and wherein switching transmission of the data representative of the video stream comprises generating a signal to selectively provide the second encoded video stream for transmission via the communication link between the UAV and the ground station upon determining the presence of the I frame in the second encoded video stream.

13. The method of claim 6, wherein transmitting data representative of the one of the first and second encoded video streams to the ground station comprises transmitting the second encoded video stream to the ground station.

14. The method of claim 13, wherein determining one or more performance characteristics of the communications link comprises determining that a bandwidth of the communications link has increased to, or above, a predetermined bandwidth value.

15. The method of claim 14 wherein switching transmission of the data representative of the video stream comprises generating a signal to selectively provide the updated first encoded video stream for transmission via the communication link between the UAV and the ground station in response to determining that the bandwidth of the communications link has increased to, or above, the predetermined bandwidth value.

16. The method of claim 15 further comprising:
further in response to determining that the bandwidth of the communications link has increased to, or above, the predetermined bandwidth value,
monitoring a frame structure of the first encoded video stream; and
determining, based on the monitoring, a presence of an I frame in the first encoded video stream.

17. The method of claim 16, wherein transmitting the data representative of the one of the first and second video streams comprises transmitting the second encoded video stream to the ground station, and wherein switching transmission of the data representative of the video stream comprises generating a signal to selectively provide the first encoded video stream for transmission via the communication link between the UAV and the ground station determining the presence of the I frame in the first encoded video stream.

18. A system for operating an unmanned aerial vehicle (UAV), the system comprising:
one or more camera sensors for capturing a video stream;
a communications interface; and
at least one computing device disposed onboard the UAV and operably coupled to: the communications interface, and the one or more camera sensors, the at least one computing device configured to:
encode the video stream captured by the one or more camera sensors in accordance with a control schedule, resulting in a first encoded video stream and a second encoded video stream;
direct the communications interface to transmit, via a communications link, data representative of one of the first and second video streams to a ground station communicably coupled to the UAV;
determine one or more performance characteristics of the communications link; and
adjust a resolution of the video stream according to the one or more performance characteristics of the communications link based on:
encoding, out-of-synchronization with the control schedule, at least a portion of the one of the first encoded video stream and the second encoded video stream resulting in an updated one of the first and second encoded video streams; and
directing the communications interface to switch transmission of the data representative of the video stream from the one of the first and second encoded video streams to the updated one of the first and second encoded video streams.

19. The system of claim 18, wherein:
the first encoded video stream comprises an encoded 720p video stream;
the second encoded video stream comprises an encoded 360p video stream; and
to encode, out-of-synchronization with the control schedule, at least the portion of the one of the first and second video streams, the computing device is configured to encode at least the portion of one of the first and second video streams ahead of a scheduled time indicated in the control schedule in response to determining that the bandwidth of the communications link has decreased to, or below, the predetermined bandwidth value.

20. One or more non-transitory computer readable media having stored thereon program instructions which, when executed by at least one processor, cause an unmanned aerial vehicle (UAV) to:
encode a video stream captured by the one or more camera sensors of the UAV in accordance with a control schedule, resulting in a first encoded video stream and a second encoded video stream;
direct a communications interface of or associated with the UAV to transmit, via a communications link, one of the first and second vide streams to a ground station;
determine one or more performance characteristics of the communications link; and
adjust a resolution of the video stream according to the one or more performance characteristics of the communications link based on:
encoding, out-of-synchronization with the control schedule, at least a portion of the one of the first encoded video stream and the second encoded video stream resulting in an updated one of the first and second encoded video streams; and
directing the communications interface to switch transmission of the data representative of the video stream from the one of the first and second encoded video streams to the updated one of the first and second encoded video streams.

* * * * *